United States Patent

[11] 3,625,768

[72] Inventors David McLeod Moulton
Route 17, Church View Lane, Knoxville, Tenn. 37921;
Walter Juda, 12 Moon Hill Road, Lexington, Mass. 02173
[21] Appl. No. 850,691
[22] Filed Aug. 4, 1969
[45] Patented Dec. 7, 1971
Continuation of application Ser. No. 431,357, Feb. 9, 1965, now Patent No. 3,356,113. This application Aug. 4, 1969, Ser. No. 850,691

[54] METHOD OF OPERATING FUEL CELL WITH MOLTEN-OXYGEN-CONTAINING ELECTROLYTE AND NON-POROUS HYDROGEN-DIFFUSING NICKEL ELECTRODE
5 Claims, 1 Drawing Fig.
[52] U.S. Cl. .................................................... 136/86 E
[51] Int. Cl. ................................................. H01m 27/20

[50] Field of Search ........................................... 136/86, 120 FC

[56] References Cited
UNITED STATES PATENTS

| 353,141 | 11/1886 | Kendall ........................ | 136/86 |
| 3,259,523 | 7/1966 | Faris, Jr. et al. .............. | 136/86 |
| 3,288,646 | 11/1966 | Soredal ........................ | 136/86 |
| 3,350,226 | 10/1967 | Lieb et al. .................... | 136/86 |

Primary Examiner—Winston A. Douglas
Assistant Examiner—M. J. Andrews
Attorney—Rines and Rines ABSTRACT: Nonporous nickel is used as a hydrogen-diffusion electrode in an elevated-temperature, molten, oxygen-containing electrolyte. Hydrogen ions formed at the electrode-electrolyte interface protect the electrode from oxidation, and the potential of the electrode is adjusted to maintain the freedom from oxidation.

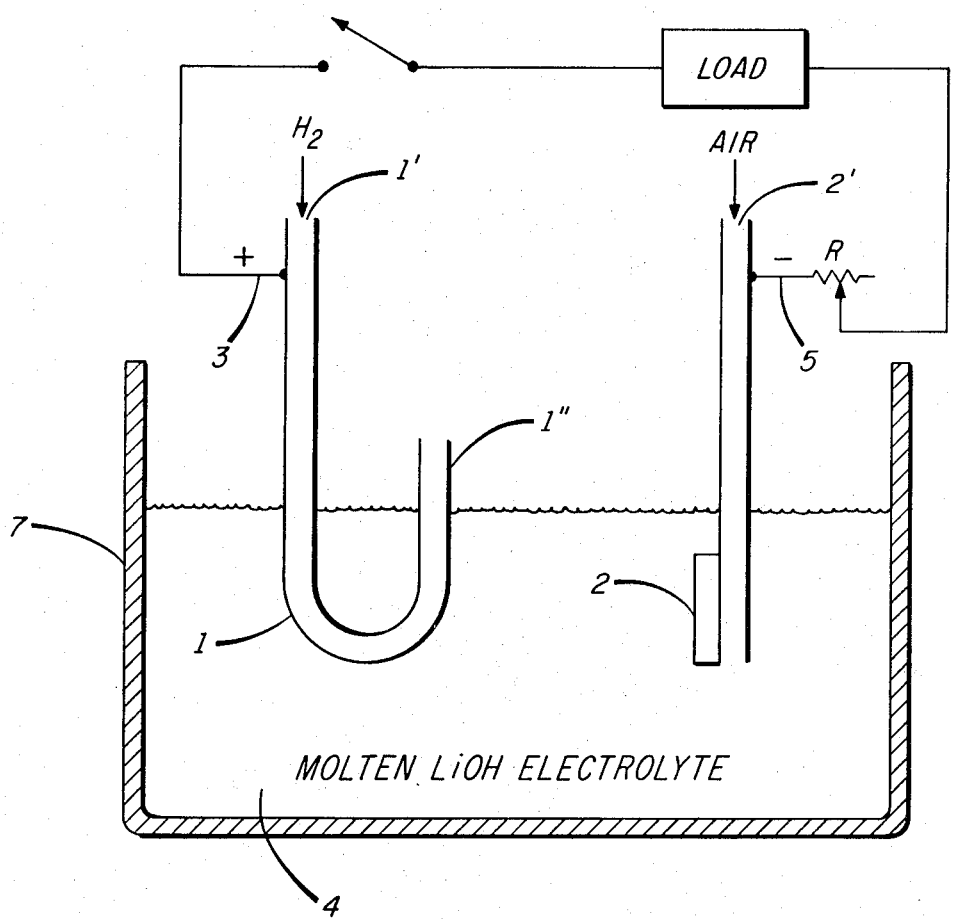
DAVID McLEOD MOULTON
WALTER JUDA, INVENTORS
BY Rines and Rines
ATTORNEYS

METHOD OF OPERATING FUEL CELL WITH MOLTEN-OXYGEN-CONTAINING ELECTROLYTE AND NONPOROUS HYDROGEN-DIFFUSING NICKEL ELECTRODE

This application is a continuation of Ser. No. 431,357, filed Feb. 9, 1965, now U.S. Pat. No. 3,356,113.

The present invention relates to chemical hydrogenation systems including electrochemical cells and, more specifically, to methods employing hydrogen-diffusing metallic layers which are to be operated in contact with electrolytic media.

In the field of fuel cells, noble metal anodes have been employed, such as anode structures made of palladium, palladium-silver and similar alloys, for the purpose of enabling the diffusion of hydrogen through the anode structure contacting the electrolytic medium of the cell. The high cost of palladium, palladium-silver and other noble metals of this character, however, has seriously limited the potential commercial applications of such cells.

A discovery underlying the present invention resides in the fact that nickel, if appropriately contacted by an elevated-temperature, molten, oxygen-containing electrolyte in such apparatus as fuel cells and the like, not only enables substantially hydrogen diffusion therethrough but, even though a base metal, as distinguished from noble metals, acts as a catalyst for the electrochemical oxidation of the hydrogen on the surface of the nickel layer contacting the elevated-temperature electrolyte, and effectively prevents the oxidation of the nickel layer despite the fact that such a base metal as nickel would normally be expected to oxidize in such electrolytic media. This discovery has enabled the use of relatively inexpensive base metal nickel as an anode, for example, in a fuel cell, contrary to the teachings of the art which have presumed that the combination of hydrogen diffusion, electrochemical oxidation of hydrogen and nonoxidation of the metal by such electrolytic media is a property only attainable with certain noble metals.

An object of the present invention, accordingly, is to provide new and improved methods employing a hydrogen-diffusing base metal layer for use with elevated-temperature, oxygen-containing, molten electrolytes, not only for such purposes as fuel cell anode electrodes and the like, but for other chemical hydrogenation applications, as well.

It should be remarked that the pores with the hydrogen and anodes have previously been employed in low temperature and medium and high temperature cells; but the art has always considered it necessary to fabricate such electrodes in a porous, nonsolid fashion so as to permit the passage of hydrogen fuel therethrough. The very fact that porous structures were considered essential, however, greatly limited the utility of nickel in such applications since impure carbonaceous fuels, which are highly important for commercial applications, contain not only hydrogen but other gaseous contaminants that readily pass through the pores with the hydrogen and contaminate the cell. Relatively low life and very limited application for the use of such nickel anodes has thus been the experience in this art. Porous nickel anode structures have been used, for example, with Bacon-type cells, but these are restricted to pure hydrogen and in addition are subject to the relatively high cost of fabrication of porous nickel electrodes and the inherent limited life and strength of such electrodes. Porous nickel electrodes have also been employed in relatively high temperature, carbonate cells where the passage of carbon dioxide impurities into the cell have not been deleterious, the carbonate cell being quite restricted in its application and not satisfactory because of the corrosion effects and because of the necessity for introducing carbon dioxide with the oxidant, requiring, also, a porous cathode construction.

In accordance with the present invention, on the contrary, the hydrogen-permeable character of solid nickel electrode structures is utilized, obviating the disadvantageous features of porous nickel electrode structures and, when used in the manner above discussed and hereinafter more fully explained, resistive to the oxidation and corrosive effects of the electrolytic medium, including even molten hydroxide electrolytic media which are most advantageous for fuel cell operation and which have not heretofore been usable with nickel anode structures and impure hydrogen fuel.

Other and further objects will be explained hereinafter and will be more particularly pointed out in the appended claims.

The invention will now be described in connection with the accompanying drawing, the single FIGURE of which is a schematic representation of a fuel cell employing novel features of the invention in preferred form.

Referring to the drawing, a solid (as distinguished from porous) nickel anode is shown at 1 in the illustrative form of a tube into which fuel, such as hydrogen, is fed at 1' and to which an output circuit connection is effected at 3. The anode 1 is shown immersed in an elevated temperature, molten electrolytic medium containing oxygen that contacts the outer side or surface of the tubular base metal nickel layer anode 1, excess fuel escaping at the right-hand anode vent 1''. For purposes of illustration, the cathode 2 is also shown in the form of a solid nickel electrode member, this time illustrated in sheet form to demonstrate another useful configuration. Oxidant, such as air, is introduced at the cathode 2 by means of an inlet 2', electrical connection to the output circuit being effected at 5. A lid for the cell and other conventional details are omitted from the drawing in order not to complicate the same with well-known structures not part of the novelty of the invention.

As previously intimated, underlying the invention is a discovery that base metals of oxidation potential (for the formation of metallic oxide) that lie below that of hydrogen at the elevated temperature of the molten electrolytic medium 4 receiving the anode 1 and cathode 2, but above the oxidation potential of the hydrogen-diffusing noble metals, such as palladium, palladium-silver, etc., before mentioned, can be sued to enable the diffusion of hydrogen from the inner side or surface of the anode layer 1 to the outer side or surface thereof that contacts the molten electrolyte 4. The outer side of the tubular nickel anode 1 catalytically forms, from the applied hydrogen, corrosion-protective hydrogen ions that serve to prevent oxidation of the base metal of the anode 1 despite the fact that, in the absence of such formation and protection, the oxygen-containing electrolyte would attack and oxidize the base metal anode, using that base metal, in effect, as a fuel, and consuming the same. One of the discoveries underlying the invention, as previously recounted, is this novel use that makes feasible inexpensive solid base metal anodes.

Further to the above ends, it is desirable in the case of hydroxide electrolytic media, to maintain as slow a concentration as possible in the region of the anode 1 within the electrolytic medium 4, thus further to prevent possible oxidation of the anode. Since the hydrogen diffusion through the solid base metal anode 1 is not as rapid as with noble metals, such as palladium, the diffused hydrogen, if a high peroxide concentration is present on the electrolyte side of the anode 1, may become consumed by the peroxide and thus destroy the protective oxidation-preventive result above mentioned. Thus, reduction in possible peroxide concentration at the anode is most desirable with this type of base metal solid structure. One preferred means for enabling such low peroxide concentration is the utilization of substantially only molten lithium hydroxide as the electrolytic medium 4.

As an illustration of the efficacy of chemical hydrogenation systems of this character, fuel cells of the type shown in the drawing have been successfully operated with a solid-walled, nickel tubular anode 1, of about 2½ mils wall thickness (with an anode area of about 2½ $cm.^2$) inserted within the electrolytic medium 4. The medium 4 was a lithium hydroxide molten electrolyte operated at a temperature of about 500° C. in free contact with air thereabove and with air used as the oxidant applied at 2' at the nickel cathode 2. Current densities up to 15 $ma./cm.^2$ were attained over prolonged periods of time at 0.85 volt with substantial protection of the base metal anode 1 against oxidation. If the polarization on the nickel anode 1 rises above the oxidation potential for the formation of nickel oxide at the temperature of the molten electrolyte, the nickel will become oxidized and destroyed. In the case of the above tests, for example, such a potential would be of the order of 0.36 volt below the open cell potential of the cell; i.e., 0.81 volt, assuming no polarization at the cathode. Insurance that the voltage never drops that far may be attained by varying the resistance R in the output circuit, for example, if a drop in voltage is noted. Impure hydrogen may readily be employed with venting of impurities at 1" since the solid nickel anode 1 only permits a diffusion through its walls of hydrogen.

The term "nickel" as used herein is intended to embrace not only commercially pure nickel, but alloys containing substantial percentages of the same sufficient to enable the attainment of the above-described operation. A typical successful base metal used in the above and other successful tests is "A" type nickel, also designated "Nickel 200", marketed by, for example, Whitehead Metals Inc., of New York City, having a nominal composition of nickel, 99.45%; copper, 0.05%; iron, 0.15%; manganese, 0.25%; silicon, 0.05%; carbon, 0.06%; and sulfur, 0.005%.

Another useful high nickel content alloy is "Monel Alloy 400" also marketed by the same company.

Included in the base metal composition, such as the nickel above-referred to, is cobalt which, insofar as chemical analysis is concerned, is usually not separated from the nickel in the composition analysis. The base metal cobalt, like nickel, has the property of an oxidation potential for the formation of metallic oxide that is below that of hydrogen at the elevated temperatures here concerned, but above that of hydrogen diffusing noble metals, such as palladium. This function is also true of pure copper, the alloying of which with other elements has the tendency to increase the effective oxidation potential at elevated temperatures.

While the advantageous use of preferably solid nickel and other base metal hydrogen-diffusing layers has been described for use in a fuel cell with elevated-temperature, molten, oxygen-containing electrolyte, as before stated, it is clear that it has decided utility for the same reasons and functions as above discussed in other types of chemical hydrogenation systems, as well.

Further modifications will also occur to those skilled in the art and all such are considered to fall within the spirit and scope of the invention as defined in the appended claims.

What is claimed is:

1. A method of operating a fuel cell at an elevated temperature at least of the order of 500° C. which comprises providing a hydrogen-diffusing nonporous nickel layer, contacting one side of said layer with a molten oxygen-containing electrolyte heated to said elevated temperature and normally highly corrosive to said layer by oxidation at said elevated temperature, applying hydrogen to the other side of said layer and forming hydrogen ions at said one side of said layer, providing an oxidant electrode in contact with the molten electrolyte, withdrawing current from a circuit including said layer and said electrode as the result of electrochemical action, and maintaining the potential of said cell at a value high enough to avoid oxidation of said nickel layer.

2. A method as claimed in claim 1 and in which the electrolyte contacted with said layer comprises LiOH.

3. A method as claimed in claim 1 and which comprises preventing substantial concentration of peroxide at said one side.

4. A method as claimed in claim 3 and in which the said preventing comprises providing LiOH in said electrolyte.

5. A method as claimed in claim 1 and in which said potential is maintained by varying the resistance in said circuit.

* * * * *